Figure 1:
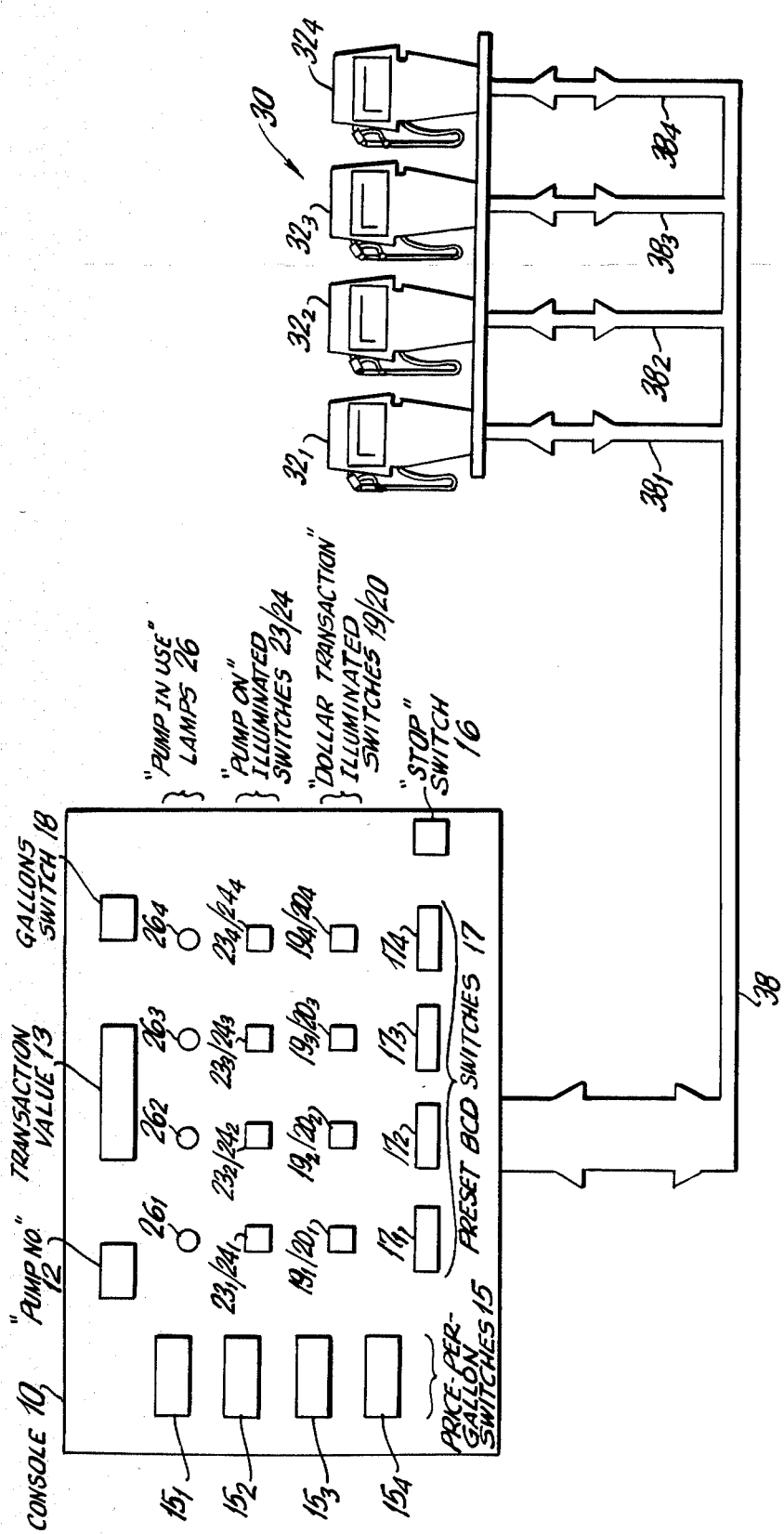

United States Patent [19]

Dow, Jr. et al.

[11] Patent Number: 4,550,859
[45] Date of Patent: Nov. 5, 1985

[54] MICROPROCESSOR CONTROLLED FLUID DISPENSING SYSTEM

[75] Inventors: John Dow, Jr., Rumson; William A. Oetting, Green Brook; Richard J. Yessian, Martinsville, all of N.J.

[73] Assignee: Lockheed Electronics Company, Inc., Plainfield, N.J.

[21] Appl. No.: 7,512

[22] Filed: Jan. 29, 1979

[51] Int. Cl.$^4$ ............................................. B67D 5/06
[52] U.S. Cl. ...................................... 222/26; 222/14; 364/465; 377/21
[58] Field of Search ....................... 222/14, 20, 25–28, 222/36–37; 364/465, 479; 235/92 FL; 377/21

[56] References Cited

U.S. PATENT DOCUMENTS 3,821,715  6/1974  Hoff et al. ............................ 364/200
3,949,207  4/1976  Savary et al. ........................ 222/26 X
4,107,777  8/1978  Pearson et al. ...................... 222/26 X Primary Examiner—Joseph J. Rolla
Attorney, Agent, or Firm—Stephen B. Judlowe

[57] ABSTRACT

Automated fluid dispensing apparatus operative under stored program control includes an attended console for controlling an array of dispensing pumps or the like, e.g., a pump island in a self service filling station. An array of data input fields, display and status signalling fields and control keys are disposed on the console. Input signalling from the console may illustratively comprise data from price-per-gallon and transaction limit registers, pump enabling keys, and display controls. Console presentations are for such as pump identity and status, and dispensed fuel value or volume. A microprocessor is connected to the console equipment, and to individual pump controllers, sensors and the like. Fluid flow at each pump is thus readily monitored and controlled by an attendant at the console via the microprocessor.

6 Claims, 5 Drawing Figures

MICROPROCESSOR CONTROLLED FLUID DISPENSING SYSTEM

DISCLOSURE OF INVENTION

This invention relates to dispensing apparatus and, more specifically, to a microprocessor controlled automated system for controlling and monitoring an array of fluid dispensing pumps or the like.

It is an object of the present invention to provide improved fluid dispensing apparatus.

More specifically, it is an object of the present invention to provide improved, modularized fluid dispensing apparatus which is flexibly operative under stored program control.

The above and other objects of the present invention are realized in specific, illustrative automated fluid dispensing apparatus operative under stored program control. An attended console for controlling an array of dispensing pumps or the like, e.g., a pump island in a self service filling station, includes an array of input fields, display and pump status signalling fields and control keys. Input signalling from the console may illustratively comprise data from price-per-gallon and transaction limit ("preset") registers, pump enabling keys and display controls. Console presentations are for such as pump status and identification, and dispensed fuel value and volume.

A microprocessor is connected via data and address buses to the console equipment, and to individual pump controllers, dispensed fluid meters, and the like. Fluid flow at each pump is thus readily monitored and controlled by an attendant at the console.

Figure 2A:
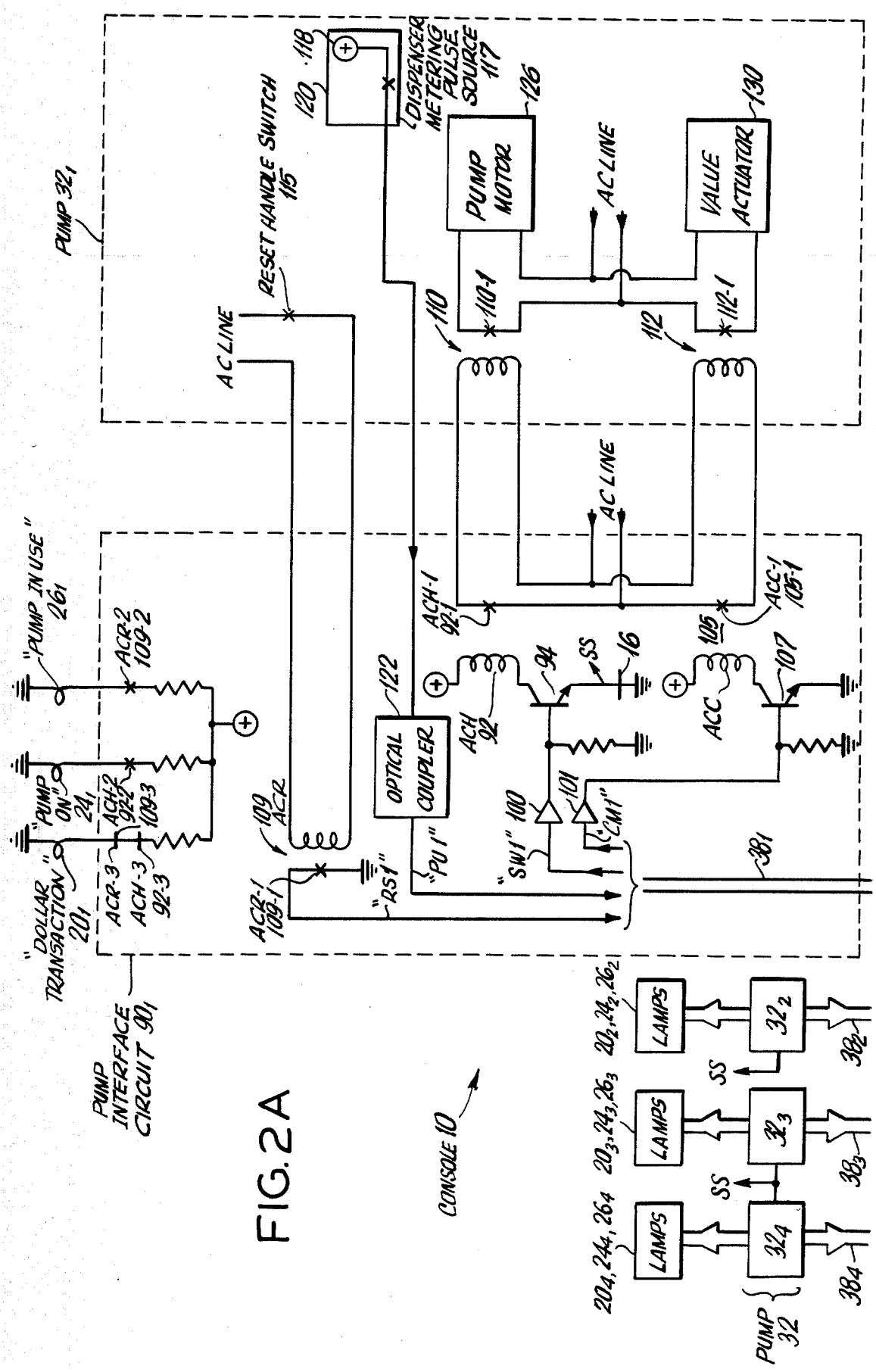
Figure 2B:
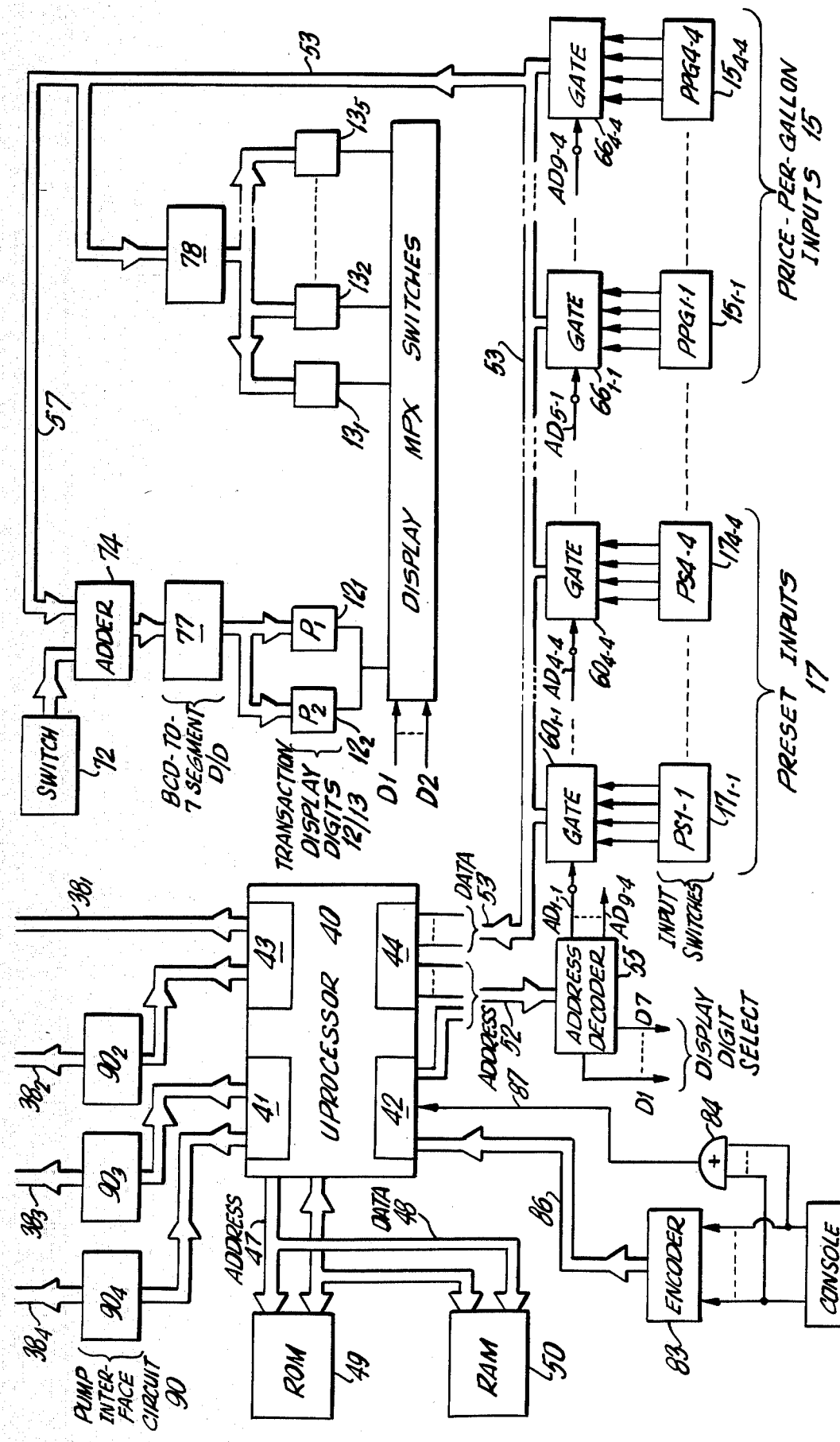
Figures 3A, 3B:
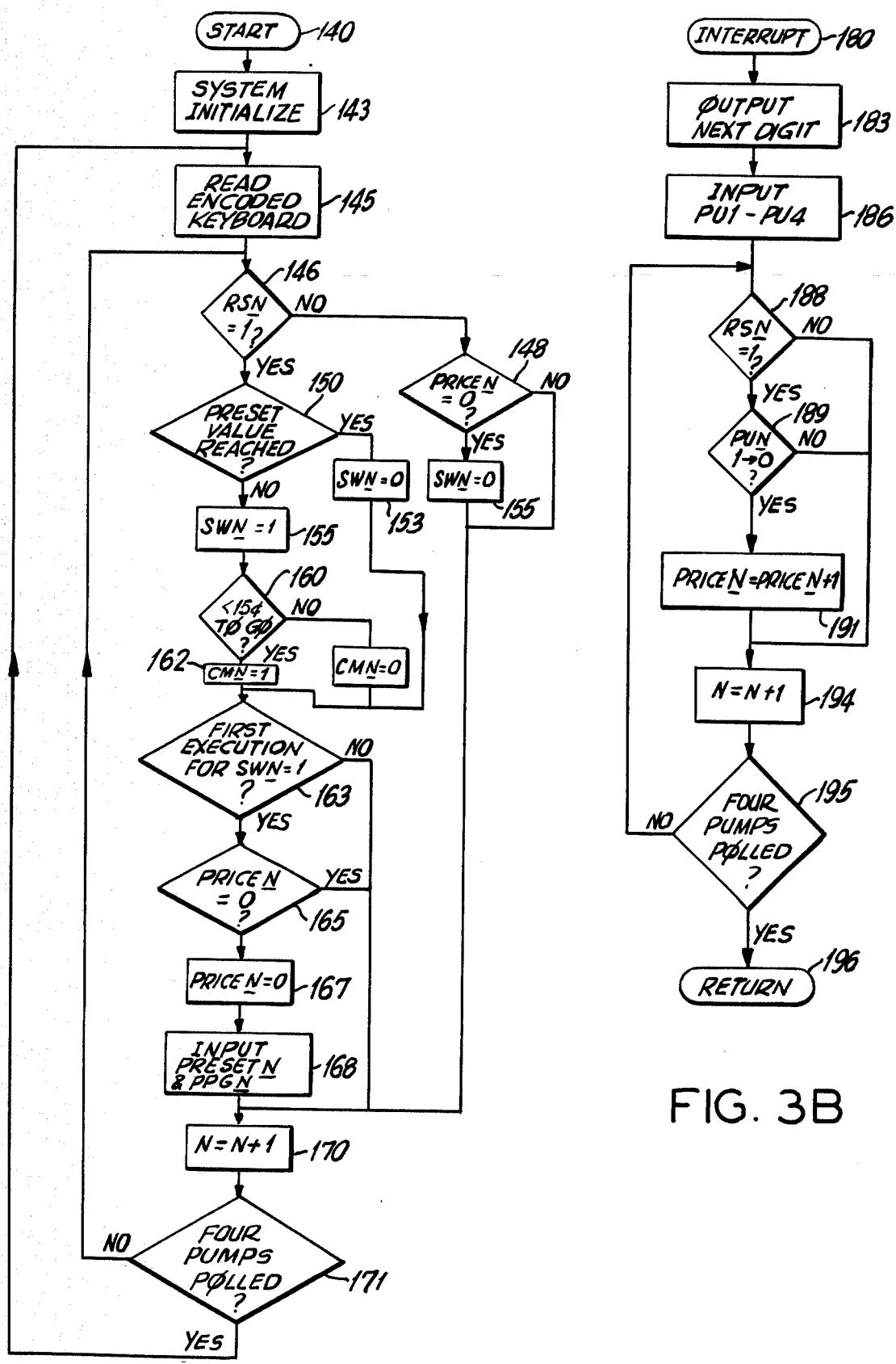

The above and other objects and features of the present invention will become more clear from the following detailed description of a specific illustrative embodiment thereof, presented hereinbelow in conjunction with the accompanying drawing, in which:

FIG. 1 is an overview schematic depiction of a composite controller console 10 and array 30 of controlled dispensing pumps 32 incorporating the principles of the present invention;

FIGS. 2A and 2B respectively comprise the upper and lower portions of a composite schematic diagram of the FIG. 1 arrangement; and FIGS. 3A and 3B are respectively flow charts for overall system processing, and for a periodically executed priority display refresh and data input routine for the composite dispensing apparatus of FIGS. 1 and 2A-2B.

Referring now to FIG. 1, there is shown in overall scope a composite dispensing organization which includes an attended controller console 10 typically located at a central location, and an island 30 including an array (e.g., four) of controlled dispensing pumps $32_1$–$32_4$ interconnected by a plural conductor bus 38. In accordance with the principles of the present invention, the controller 10 module shown regulates and also monitors fluid, e.g., gasoline, dispensed at the individual pumps $32_i$ each of which is separately controlled and monitored. A larger dispensing environment, such as a substantial gasoline filling station including plural pump islands 30, includes plural consoles 10 at the central attended location, each controlling its associated modular array of pumps 32.

Included on the console 10 are a first series of data register input devices, for example, plural decade BCD encoded thumb wheel switches $15_1$–$15_4$ for entering the price per gallon to be charged at the corresponding pumps $32_1$–$32_4$. Similarly, an array of four input devices $17_1$–$17_4$, e.g., again most simply BCD encoded thumb wheel switches, are provided to establish a preset limits for gasoline to be dispensed at an associated one of the pumps $32_1$–$32_4$ for a particular transaction. That is, each of the switches $17_i$, illustratively of four BCD decades for entering an amount from a hundreds of dollars digit through a tens of cents digit, will automatically terminate dispensing of fuel at the associated pump $32_i$ when the preset value worth of fluid has been supplied.

Further by way of input signalling apparatus at the console 10, a momentarily depressed "dollar transaction" switch portion $19_i$ of an illuminated (e.g., light emitting diode, "LED" $20_i$) switch $19_i/20_i$ is actuated to display via a plural digit display 12, 13 the dollar amount of a transaction (in display field 13), and the pump $32_i$ number (the index i in the foregoing statement) at the pump number display field 12. Similarly, a momentarily depressed switch portion $23_i$ of an illuminated switch $23_i/24_i$ is employed via the data processing circuitry below discussed to arm (i.e., condition for enabling) a particular pump $32_i$ the armed or enabled condition being shown by the illuminated associated LED $24_i$. Further, one of an array of "pump in use" signalling LED's $26_i$ is illuminated when the corresponding pump $32_i$ is actually in use, i.e., enabled responsive to actuation of the corresponding switch $23_i$ and where the customer at the pump $32_i$ has reset (activated) the pump handle to in fact dispense fuel when the pump nozzle is squeezed.

A "gallons" switch 18 when actuated converts the "transaction value" display 13 from a monetary valuation to a presentation of the gallons dispensed, the two being related by a division factor comprising the price per gallon setting of the corresponding register $15_i$. A "stop" switch 16 disables all of the pumps 32 in the island 30 when actuated, e.g., when an attendant notes a hazardous condition or the like.

To functionally illustrate a transaction when the FIG. 1 dispensing organization is employed in a self service gasoline station, a customer pulls his vehicle alongside one of the pumps $32_i$. If the customer desires a preset dollar amount of fuel, he communicates this to the attendant who enters the appropriate amount at the corresponding register $17_i$. If no set maximum amount is desired, the preset switch $17_i$ is set to a number substantially higher than the maximum gallonage which the vehicle can require. In practice, when no preset value is desired, each of the switch registers 17 may be left in the maximum position.

To begin the process, the attendant noting a request for service enables the pump $32_i$ by momentarily depressing the associated switch $23_i$, proximately also latching on and illuminating the "pump on" display diode $24_i$. The momentary depression of the switch $23_i$ by system functioning more fully described below actuates relay contacts at the pump $32_i$, energizing the pump motor. The consumer at the pump $32_i$ then switches the per se conventional pump arming handle to its active or "reset" position causing the "pump in use" display diode $26_i$ to illuminate. At this point, the pump $32_i$ is fully activated and dispenses fuel when the consumer places the pump nozzle in his vehicle tank and opens same.

Following nozzle unblocking, fuel flows through the dispensing pump $32_i$ into the vehicle. Such fluid flow is initially rapid, a high speed (large orifice) internal pump valve being initially activated. As fuel is dispensed, an electrical fuel metering signal is produced at the pump and provides one pulse for each penny's worth of fuel dispensed. Such metering pulse sources are per se conventional, e.g., illustratively comprising a volumetric (as positive displacement) flow sensing device mechanically connected to by an adjustable cone gear multiplier (to effect a volume-to-monetary conversion) to open and close a reed switch once for each penny of fuel provided. These penny pulses are electrically counted and accumulated at the console 10 as well as being mechanically displayed at the pump $32_i$ in a per se conventional manner.

While fuel is being dispensed, the attendant may monitor the fuel flow by depressing the corresponding switch $19_i$. The pump number (the index i in general augmented by a fixed increment when plural consoles 10 and islands 30 are employed) is displayed at the two positions decade "pump number" display 12 while the increasing transaction amount is displayed in the five digit display 13. If gallons are desired, the gallon switch 18 is depressed and maintained depressed. This converts the transaction value to gallonage by a division factor corresponding to the price per gallon value reposing in the switch $15_i$.

If a meaningful preset limit value has been entered in the switch $17_i$, the above rapid dispensing mode persists until the fluid provided comes within a predetermined narrow bound of the preset value, e.g., within fifteen cents. At this point, the fast dispensing valve is disabled, providing the remaining 15¢ of fuel at a relatively slow rate of a fixed, relatively small pump $32_i$ dispensing orifice. If no meaningful preset value is entered, all fluid will be dispensed using the high rate nozzle, flow being terminated in a conventional manner either automatically by nozzle sensing that the vehicle tank is full, or by a customer purposefully deactivating the pump nozzle.

After the desired fuel has been dispensed, the nozzle is restored in the pump $32_i$ and the pump arming handle restored to its off (non-reset) position. This turns the "pump in use" lamp $26_i$ off, "pump on" lamp $24_i$ having previously been turned off at the completion of fuel dispensing. At this point, the transaction is completed and the corresponding dollar "transaction" display diode $20_i$ illuminates, thereby signalling the attendant at the console 10 that service via the pump $32_i$ is completed and is ready for revenue collection. The attendant when ready depresses switch $19_i$ (assuming the attendant to have previously been monitoring some other pump transaction) to obtain the transaction value at display 13, the "i"-dependent pump identification being correspondingly presented at display field 12.

The above described operation has characterized operation of the console 10 and the pump array 32 with respect to operation of a generalized one of the pumps. The composite apparatus operates in the above described manner for each of the pumps and its related console components such that each of the pumps 32 may be individually actuated, controlled and monitored, each in general being at a different state in the overall fuel dispensing cycle of operation.

Having discussed above the operation of the fuel dispensing organization of the instant invention in overview with respect to FIG. 1, attention is now directed to the schematic diagram of FIGS. 2A and 2B (hereinafter referred to as composite FIG. 2) which depicts the FIG. 1 arrangement in detail. The console 10 includes a microprocessor 40 having read only memory (ROM) 49 and a read-and-write memory (RAM) 50 connected thereto via address and data buses 47 and 48. The microprocessor 40 includes latching multi-bit input/output ports 41–44, such that the microprocessor 40 can store information at such ports (on an individual digit by digit basis if required) or read information externally applied at such ports. Specific implementations of the microprocessor 40 are well known per se to those skilled in the art and, include, for example, the F-8 family of integrated circuits manufactured and sold by the Fairchild Semiconductor Corporation, Mountainview, Calif. which, indeed, incorporate as an integral part thereof, ROM and RAM memory and thus do not require the separate elements 49 and 50 nor the separate external buses 47 and 48. The program for the microprocessor 40 is stored in the ROM 49, while scratch pad memory and computational storage variables are contained in the RAM 50. The microprocessor 40, ROM 49 and RAM 50 operate in a per se conventional manner; for the instant application, the ROM program algorithm being set forth in flow chart form in FIGS. 3A and 3B.

The several data and address buses shown in FIG. 2 in essence supply control and display information from the central processor unit (CPU) 40 to the appropriate elements above discussed with respect to FIG. 1 and repeated below; and also communicate all requisite information to the microprocessor 40. For the latched port type of microprocessor shown in the drawing, the several digits, or bit positions in each of the ports 41–44 (or any combination thereof) is assigned a significance as belonging to either an effective data bus or address bus. Thereafter regarding that port, data is communicated to or from the microprocessor 40 in a per se conventional common bus manner. Examining first, for example, the port 44 and right portion of port 42, there is connected thereto a data bus 53, and an address bus 52 (which has several input conductors connected to bit positions of the port 42). The port 44 and right portion of the port 42 thus serve as one effective combined CPU I/O port.

A plurality of console 10 (FIG. 1) input data signalling elements are connected to the data bus 53 via a respective gate. Thus, for example, each preset input register switch 17 BCD decade $17_{i-j}$ is connected via a gate $60_{i-j}$ to the data bus 53. As above discussed, each of the preset switches $17_i$ consist of four independent BCD decades, there thus being sixteen decades $17_{1-1}, \ldots, 17_{4-4}$ overall. When a preset value of register $17_i$ is to be entered into the microprocessor (functional operation 168 in FIG. 3A), the appropriate addresses for the four BCD decades $17_{i-1}-17_{i-4}$ are supplied to the address bus 52, decoded by an address decoder 55 to sequentially enable (outputs ADi-1, . . . , ADi-4) the four corresponding gates $60_{i-1}-60_{i-4}$ thus coupling the desired preset information to the microprocessor input port 44 (and thereafter for storage in RAM 50). The gates 60 above described, as well as the other gates herein, are illustratively of the tri-state type, thus effectively isolating the preset BCD switch decade from the bus 53 and not loading the bus 53 when in the not-enabled state. Again, the functioning of address decoder 55 to selectively connect a desired element to a common bus 53 under microprocessor 40 control via gate enablement is per se well known, and will not be repeated herein for all other common bus connections for the microprocessor 40. Similarly and in brief, the BCD price per gallon switch 15 decades (again sixteen in number $15_{1-1}, \ldots ,$ $15_{4-4}$ for the four entries (one per pump)) are connected to the bus 53 through gates $66_{1-1}, \ldots, 66_{4-4}$ for entry to the microprocessor 40 (and RAM 50) under appropriate address commands impressed on the address bus 52 by the microprocessor 40. The information passes to CPU 40 under operation of the gate enabling output signals from address decoder 55 (enabled decoder outputs AD5-1, ..., AD9-4).

The microprocessor 40 ports 42 and 44, and the data and address buses 53 and 52 coupled thereto, also operate the console 10 "pump number" display decades 12, and the five "transaction value" display decades 13. It will be assumed that such display decades are of the common seven segment electronic type, although any other electronic or electro-mechanical display implementation may be employed as well. The display decades $12_1$ and $12_2$ respectively are the units and tens digits for the "pump number" field 12 on console 10, while the display decades $13_1$–$13_5$ respectively comprise hundreds of dollars through cents decimal digits for the "transaction value" field 13 of console 10.

In overview, the display decades $12_1, 12_2, 13_1, \ldots, 13_5$ are operated as one composite display energized in a per se well known time division manner, i.e., where each of these seven electrical display decades are serially and cyclically energized one at a time, but sufficiently rapidly such that the persistence of each display avoids the appearance of flicker to a human observer. Accordingly, the displays $12_1$–$12_2$ and $13_1$–$13_5$ create a continuous presentation of the transaction value and pump number.

Two display decades $12_1$ and $12_2$ are utilized notwithstanding that only four pumps are controlled by the console 10 since a number of such consoles and their attendant pumps may and typically will be used, as for a relatively large filling station. To this end, a thumb wheel switch 72 (not mounted on the console 10) or other data input device is included in the console circuitry to enter a fixed increment required for the desired number for the lowest designated of the four consecutively numbered pumps $32_1$–$32_4$ ("1" less than the desired initial pump number). This constant pump number increment information is supplied by the plural decade switch 72 to a digital adder 74. Also supplied to the adder 74 by data bus 53 during the cyclically recurring time division periods when the "pump number" display decades 12 are to be refreshed is the number (subscript) of the particular pump of the four $32_1$–$32_4$. A BCD-to-seven segment decoder-driver 77 takes the pump identification to be displayed in console field 12 (the output of adder 74) and drives each of the seven segments of the "pump number" units and tens digits display decades $12_1$ and $12_2$.

When these two field 12 digits are sequentially energized during composite time division display energization, an appropriate address field is impressed by the microprocessor 40 on bus 52; decoded as active D1 of D2 display digit enabling outputs from address decoder 55 of the seven such signals D1–D7 to cause energization and illumination of the pump number display field 12. Similarly, but more simply, during the period when the respective display digits for the "transaction value" field 13 are sequentially pulsed, a BCD-to-seven segment decoder driver 78 receives the appropriate decade information impressed on the bus 53 (typically four bits to display one of the decimal numbers "0-9") and drives the seven segments of each of the display decades $13_1$–$13_5$ in parallel. The appropriate and only the appropriate one of the display decades will be energized, however, depending upon the information supplied to the address bus 52 which, in turn, is translated by decoder 55 into an activated one and only one of the display digit select lines D3–D7. Accordingly, during the display refresh and update functional operation 183 of the FIG. 3B flow chart, each of the digits in the display fields 12 and 13 is energized in a time division manner to display pump number, and either gasoline consumption value or dispensed gallonage depending upon the state of console switch 18.

As above discussed with respect to FIG. 1, a particular switch $19_i$ is momentarily depressed when an attendant wishes to monitor a particular pump; the switch 18 depressed if gallons vis-a-vis price is to be displayed in field 13; and a switch $23_i$ depressed if the attendent wishes to enable a particular pump $32_i$. These switches, each illustratively of a simple momentary closure single pole, single throw type, are connected to an encoder 83 which may illustratively simply translate the console panel input switch short circuit or open circuit conditions to a four bit code on a bus 86 for coupling to the microprocessor 40 input port 42. An OR gate 84 has its inputs connected to the leads from the respective console switches to supply an energized read signal on a line 87 to the microprocessor 40 when any one of the switches is activated. The microprocessor 40 may thus simply examine the bit position connected to the conductor 87 which serves as a flag bit to determine when a switch is being depressed (and via the other port 42 inputs, which). Presently available encoders 83 in integrated circuit form already include the OR logic function of the gate 84. Thus, the "read encoded keyboard" operation 145 of the FIG. 3A flow chart simply requires an examination of the input port 42 to read in any service requests.

The microprocessor 40 ports 41 and 43 are utilized to control and read information from the array of controlled pumps $32_i$ via pump interface circuits $90_i$ (the circuit $90_1$ associated with a first one of the pumps $32_1$ being shown in detail) and bus 38 portion $38_i$. The detailed circuitry $38_1$–$90_1$–$32_1$ for the first pump position is illustrative as well for the buses $38_{2-4}$ and interface circuits $90_{2-4}$ which control the pumps $32_{2-4}$, which will thus not otherwise be specifically discussed.

Examining now the control of the fluid dispensing pump $32_1$ by the microprocessor 40 and interface circuitry $90_1$, as a first matter actuation of the "pump on" switch $23_1$ when the attendant wishes to enable the pump $32_1$ is converted by the microprocessor 40 into an active (e.g., "1" state) SW1 signal (the computational vector variable SW$\underline{N}$, where in this case N=1) which turns on a transistor switch 94 via buffer amplifier 100. The activated switch 94 energizes the coil of an A.C. Hot rely 92 thereby closing normally open contacts 92-1. The closed contacts 92-1 of the A.C. Hot relay 92 couple A.C. line potential to the coil of a repeating relay 110 located at the pump $32_1$, thereby closing the associated contacts 110-1 and supplying A.C. voltage to the pump motor 126. Thus, the pump $32_1$ is enabled to dispense fluid under control of the customer at the pump. It is noted that all relay contacts are shown in FIG. 2 in conventional detached contact form.

The activated A.C. Hot relay 92 also closes normally open contacts 92-2, thus supplying potential across the "pump on" light emitting diode $24_1$ illuminating the "pump on" display $24_1$ on the console 10. The CPU 40 also selectively supplies to the pump $32_1$ an activated computational variable CM1 (again of a storage variable field $CM\overline{N}$ where N=1 for the interface circuit $90_1$) which turns a transistor switch 107 on via a buffer 101. This activates an A.C. Common relay 105 closing normally open contacts 105-1 and energizing a high speed dispensing valve via valve actuator solenoid 130 acting through a coupling relay 112 at the pump $32_1$ sites. The A.C. Common relay 105 is enabled up to the point when the gasoline dispensed comes within the predetermined amount (15¢ assumed above) of the preset value in register switch $17_1$ (previously stored in memory during functional operation 168 of FIG. 3A). Thereafter, the energized CM1 signal reverts to a "0" state to de-energize the actuator 130 by resetting the relays 105 and 112 to their inactive states, such that the fluid is dispensed for the remaining 15¢ by the low speed pump orifice.

The pump $32_1$ includes a dispenser metering pulse source 117 which provides one output pulse for each one cent worth of fluid dispensed. Such apparatus is per se well known for fluid dispensing pumps $32_1$ and may comprise, for example as above noted, a positive displacement sensor turning at a rate measuring volumetric fluid flow which drives a variable ratio cone gear multiplier mechanically set to reflect the price per gallon for the product dispensed at the pump. The output of the cone gear multiplier may simply comprise a shaft having a magnet secured thereto which passes in proximity to and thereby actuates a reed switch 120 once for each cent of fluid dispensed. The metering pulse stream from the source 117 passes through an optical coupler/isolator 122 and generates a computational variable PU1 (of the ensemble $PU\overline{N}$) which is coupled to the microprocessor input port 43 via bus $38_1$. The isolator 122 is employed to obviate any requirement for a common D.C. ground between the pump 32 apparatus and the console 10.

Finally, the pump $32_1$ includes an electrical switch 115 which is coupled to the reset handle on the pump. The switch contacts 115 close when the consumer at the pump shifts the handle to its active dispensing ("reset") position, which the consumer must do before fluid can flow from the nozzle 11. The closed contacts 115 actuate an A.C. Reset relay 109, thereby signalling the active pump state ("1" level RS1 signal, there being comparable $RS\overline{N}$ variables for the remaining pumps) to the microprocessor 40. The activated A.C. Reset relay 109 signalling that the pump is in the active condition also illuminates the "pump in use" light emitting diode or the like $26_1$ via contacts 109-2. The illuminated display $26_1$ on the console 10 communicates the status of the pump $32_1$ to the attendant.

Normally closed contacts 92-3 and 109-3 of the A.C. Hot and A.C. Reset relays illuminate the "dollar read out" console display $20_1$ when neither the A.C. Reset nor the A.C. relay 92 is activated. This advises the attendant that the transaction is completed for pump number "1" (illuminated "dollar transaction" display $20_1$) an event which occurs if the consumer has turned off the pump (disables A.C. Reset relay) and where the microprocessor 40 has disabled the pump motor 126 by clearing the SW1 signal to the "0" state. The final equipment item is the normally closed stop switch 16 which when activated disables all pumps 32 by opening contacts in series with each interface $90_i$ transistor switch 94 emitter, thus removing power from the pump motors 126.

The above completes the description of each of the structural items included in the composite fluid dispensing system which perform all of the functions described above with respect to the FIG. 1 overall presentation.

The flow charts for the ROM 49 stored program controlling the microprocessor 40 are shown in FIGS. 3A and 3B. As a general matter, the FIG. 3A flow chart depicts the cyclically repeating master data processing in overall scope, while that of 3B is directed to display 12/13 control and accumulating the dispensing pulses supplied to the CPU 40 via the four pump pulsing variables $PU\overline{N}$. Since it is obviously important to refresh the display at a minimum frequency to avoid flicker, and to read the $PU\overline{N}$ variables sufficiently frequently to not miss any dispensing pulses, the FIG. 3B flow chart is operated periodically on an interrupt basis, most simply at fixed predetermined recurring periods of time signalled by the microprocessor 40 internal clock (INTERRUPT entry state 180).

Examining first in overview flow chart of FIG. 3A, program control passes from a start state 140 to a system initializing operation 143 which effects the per se usual program execution housekeeping operations such as clearing index and accumulation registers, and the like. The encoder 83 and OR gate 44 (FIG. 2) digital values supplied to microprocessor 42 port are then read into memory (operation 145 above discussed). Program control then iteratively passes through a program loop (operatins 146–171) operative with an index N (ascribing thereto values 1–4) such that the loop performs data processing for each of the pumps $32_1$–$32_4$.

It will be understood that data processing by the functional operations 145 and 171 continuously recur as long as the composite FIG. 1 system remains operative, typically for extended periods of time. Thus, for any single iteration through the inner loop (operations 146–171) or outer loop (operations 145–171 executions), as a generality the four controlled pumps $32_1$–$32_4$ will as a generality be in different stages of their dispensing cycles.

With this background, and examining the iterative loop of operations 146–171, an index variable N passes through its values 1–4 to sequentially consider data associated with the pumps $32_1$–$32_4$. For any one pass through these operative steps, test 146 passes control to a subsequent test 150 if the value of $RS\overline{N}$ is "1", i.e., if the corresponding pump $32_n$ is reset and thus active ($RS\overline{N}$ being the input variable signal supplied to the microprocessor 40 by closed relay contacts 109-1 of FIG. 2). Assuming this to be the case ("YES" output of test 146) and assuming that the preset value of the price of fluid dispensed at the subject (Nth) pump $32_n$ has not reached its preset value, the resulting "NO" output of test 150 sets or maintains as the case may be, the pump $32_n$ motor 126 to an energized state by supplying a "1" value for the variable $SW\overline{N}$. Thus, the pump $32_n$ is fully armed and active. If more than 15¢ remains to be dispensed, i.e., if the value of the present transaction to date stored in a storage valuable $PRICE\overline{N}$ is more than 15¢ less than the preset value stored in a variable $PRSET\overline{N}$, an active $CM\overline{N}$ signal issues to maintain the actuator 130 in its high speed value state. If this is not the case ("NO" output of test 160) functional operation 161 clears $CM\overline{N}$ to "0".

If the loop iteration is the first for pump enabling, i.e., the first execution for $SW\overline{N} = 1$ (test 163), operation 167 clears the transaction register $PRICE\overline{N}$ and operation 168 inputs (reads) into the microprocessor memory the preset value and the price per gallon (PPG$\underline{N}$) quantities from the console 10 switchboard. If this is not the first iteration for SW$\underline{N}$=1, or if PRICE$\underline{N}$ is already cleared (test 165) system control passes to operation 170 to cyclically increment the running index N and test 171 returns control to test 146 to begin processing data for the next following pump.

If the first test 146 resulted in a "NO" result indicating that the pump handle has not been reset at the pump, i.e., that no consumer thereat has activated the pump for service, test 148 and functional operation 155 disable the pump motor if the price register is clear and not otherwise.

The above loop 146–171 undergoes four iterations, one for each of the pumps $32_1$–$32_4$, whereupon test 171 returns program execution to operation 145 to again examine the console keyboard switches 15, 19 and 23 for possible new attendant-entered requests. The overall processing mode of FIG. 3A thus repetitively processes commands and data for the pumps 32, as well as monitoring and responding to control and inquiry commands and display presentations required at the console 10.

The periodically utilized interrupt priority program routine of FIG. 3B proceeds from an entry state 180 to a first task 183 of outputting the next display 12/13 digit, i.e., impressing on the address bus 52 the address (identity) of the next one of the display digits $12_1$, $12_2$, $13_1$–$13_5$ to be illuminated, as well as sending the data for the illuminated digit on data bus 53. The functional operation 183 maintains an internal cyclic modulo seven-like index to time division multiplex the seven digits $12_1$, $12_2$, $13_1$–$13_5$. The data displayed at digits $13_1$–$13_5$ is normally the transaction price information stored in the price accumulation register PRICE$\underline{N}$, unless the "gallons" switch 18 is held depressed, whereupon these display digits $13_1$–$13_5$ display gallons dispensed (a computational variable GALL$\emptyset$N$\underline{N}$ given by the quotient of PRICE$\underline{N}$ divided by PPG$\underline{N}$). Operation 186 inputs the four metering pulse variables PU1–PU4, and an execution loop of instructions 188–195 process the penny pulse signals incrementing the PRICE$\underline{N}$ registers as appropriate. To this end, test 188 determines whether or not the pump is active (RS$\underline{N}$=1) and, if so ("YES" branch) actuates test 189 to determine whether the penny pulse signal for the particular iteration has switched from a "1" value to a "0" value. If so, instruction 191 increments the price register by one penny; the index variable N is incremented (operation 194); and final loop terminating test 195 either returns operation to the FIG. 3A overall program or returns operation to test 188 if processing for each of the four pumps has not yet been completed.

Accordingly, the FIG. 2 microprocessor arrangement has thus been shown to execute the software routines of FIGS. 3A and 3B to implement all requisite functions of the FIG. 1 fluid dispensing apparatus and environment.

Numerous modifications and adaptations of the present invention will be readily apparent to those skilled in the art without departing from the spirit and scope of the present invention. Thus, for example, any form of data processing equipment, i.e., one using the per se conventional data and address buses for all peripheral (to the microprocessor) connections rather than the dedicated input/output ports and plural buses, may be employed. Then also, the console 10 displays $20_i$, $24_i$, and $26_i$ may themselves be treated as peripheral items controlled directly by the microprocessor, rather than being hardware operated as shown in FIG. 2.

What is claimed is:

1. In combination in a fluid dispensing system, a microprocessor including plural latched input-output ports, a program storing read only memory and a read and write variable memory connected to said microprocessor, plural pump means, plural interface circuit means and first bus means connecting each of said pump means with at least a first one of said microprocessor ports, console means, and further address and data bus means connecting said console means with further of said microprocessor input-output ports, each said pump means including reset switch means and dispensed fluid metering means communicating to said first one of said microprocessor input-output ports via an associated one of said interface circuit means and pump motor selective energizing means controlled by said microprocessor through said associated interface circuit means, said console means including plural pump enabling switch means and display means each connected by said further address and data bus means with said further input-output ports of said microprocessor.

2. A combination as in claim 1 further comprising plural transaction display signalling switch means, and encoder means connecting said plural pump enabling switch means and said plural transaction display switch means with said bus means and said further microprocessor input-output ports.

3. A combination as in claim 1 or 2 wherein said console means comprises a plurality of pump status signalling displays, and means responsive to said reset switch means in said pump means for selectively illuminating said status signalling displays.

4. A combination as in claim 1 or 2, further comprising means for refreshing said display means and for processing the output of said fluid metering means on a cyclically recurring priority basis.

5. A combination as in claim 1 or 2 wherein said console means further comprises plural preset input register means and plural price input register means connected to additional of said plural microprocessor input-output ports via said bus means.

6. A combination as in claim 5 wherein each of said pump means includes controlled high rate fluid dispensing means, and means included in said interface means for energizing said high rate fluid dispensing means for the period prior to said metering means signalling that said pump means has dispensed an amount of fluid a predetermined amount less than the contents of said preset input register means.

* * * * *